United States Patent [19]

Rusanov et al.

[11] 4,359,058
[45] Nov. 16, 1982

[54] PRECLEANER OF A GRAIN HARVESTING MACHINE

[76] Inventors: Alexander I. Rusanov, Sadovo-Chernogryazskaya ulitsa, 16/18, kv.100, Moscow; Vitaly P. Gavrilov, ulitsa Profsojuzov, 14, kv.57, Krasnoyarsk; Jury N. Yarmashev, I Krepostnoi pereulok, 34, kv.213, Taganrog; Pavel M. Arbuzov, ulitsa Robespiera, 23, kv.18, Krasnoyarsk; Nadezhda M. Levit, Yaroslavskoe shosse, 125, kv.79, Moscow, all of U.S.S.R.

[21] Appl. No.: 223,992

[22] Filed: Jan. 12, 1981

[51] Int. Cl.³ .............................................. A01F 12/18
[52] U.S. Cl. .............................. 130/27 Z; 130/27 E; 130/DIG. 5
[58] Field of Search ................. 130/27 R, 27 Z, 27 E, 130/DIG. 4, DIG. 5, DIG. 6

[56] References Cited

U.S. PATENT DOCUMENTS 2,409,292  10/1946  Mac Gregor ..................... 130/27 Z
3,760,813  9/1973   Mathews ......................... 130/27 HF

FOREIGN PATENT DOCUMENTS 86449   8/1956   Fed. Rep. of Germany .... 130/27 Z
569982  11/1957  Italy .................................. 130/27 Z
903607  4/1961   United Kingdom ............. 130/27 Z

*Primary Examiner*—Robert A. Hafer
*Attorney, Agent, or Firm*—Robert E. Burns; Emmanuel J. Lobato; Bruce L. Adams

[57] ABSTRACT

A characteristic feature of the present invention is the fact that in a precleaner device incorporating an element conveying the cropped material being treated to the sieves and cleaning fan, provision is made for a cropped material thrower and a perforated rotary cylinder both being interposed between the conveying element and the sieves. The rotary cylinder accommodates a fan adapted for catching the light admixtures from the cropped material being treated.

10 Claims, 3 Drawing Figures

PRECLEANER OF A GRAIN HARVESTING MACHINE

BACKGROUND OF THE INVENTION

This invention relates generally to crop harvesting machinery and has particular reference to devices for separating light admixtures from the cropped material treated by a grain harvesting machine.

Known in the present state of the art cropped material precleaners, comprising a conveying element, sieves and a cleaning fan. The cropped material from under the threshing and separating device is fed onto the conveying element (that is, a grain pan, augers, chain-and-slat conveyer, etc.), which transfers it onto the sieves, wherein stray admixtures (i.e., cavings, chob) are separated from grain.

The above-discussed precleaners are disadvantageous in having comparatively low throughput capacity by the fact that any increase in the rate of feed of the cropped material for such cleaning above the permissible level specified for a given grain harvesting machine causes considerable loss of grain. This prevents the provision of a reliable cleaning unit for high-throughput grain harvesters.

Some prior-art grain harvesters are known to incorporate devices for precleaning the cropped material before its being fed onto the sieves. These precleaning devices are known either in the form of an aspiration duct or as two rubber-clad rolls adapted to throw the cropped material into the air stream. While passing through the above-mentioned precleaning devices the cropped material loses part of the light admixtures, whereby partially cleaned cropped material is fed onto the sieves.

The above-mentioned precleaners are disadvantageous in featuring but low-efficient air-stream separation of the light admixtures from the grain, as the cropped material is separated into fractions only by their aerodynamic properties. As a result, a great deal of grain is carried away along with the light admixtures at higher rates of feed of the cropped material, which likewise impedes the provision of a cleaning unit for high-throughput grain harvesters.

SUMMARY OF THE INVENTION

An essential object of the present invention consists in the provision of a cleaning unit for grain harvesters, which would feature higher throughput capacity compared with the heretofore known grain harvesters.

Another object of the present invention resides in separating the chaff, which is most valuable as fodder, from the cropped material and its subsequent collecting in separate receptacles, or its placing on the straw windrow behind the grain harvester.

The above-mentioned and other objects are achieved due to the fact that in a precleaner of the cropped material treated by a grain harvesting machine, incorporating an element conveying the cropped material to the sieves and fan, according to the present invention, interposed between the conveying element and the sieves are a thrower of the cropped material and a perforated rotary cylinder, which accommodates a fan adapted for catching the light admixtures from the cropped material being treated.

It is expedient that a chamber for the light admixtures of the cropped material under treatment to collect and bring outside of the grain harvesting machine be held hermetically to the surface of the rotary cylinder.

It is likewise desirable that the light admixtures be brought out of the chamber by way of an emptying auger conveyer provided in the abovesaid chamber.

The essence of the present invention resides in the following.

As more than half the total amount of straw admixtures is eliminated from the cropped material under treatment, loss of grain past the sieves is reduced fourfold or even more, while the grain cleanness standards are met fully. The cropped material precleaner device uses for its operation the principle of air-impulse separation, whereby aerodynamic and elastic properties of the cropped material components are used to separate these into fractions. It is due to a great difference in the aerodynamic and elastic properties of the gain and of the chaff and straw particles that high effect of separation of the cropped material into fractions is attained.

The cropped material precleaner device is situated in a grain harvesting machine before the sieves but past the conveying element, which makes it possible to use the cropped material precleaning effect for attaining higher throughput of the cleaning unit.

Provision of a cropped material thrower in the precleaner device ensures that the straw particles and the grain are thrown onto the cylinder surface at a required speed. As a result, individual components of the cropped material impinge upon the cylinder surface, whereupon the grain as possessing some elastic properties, bounces out of the cylinder surface, while nonelastic straw particles are held back thereon.

Provision of perforations in the cylinder surface and accommodation of a fan inside the cylinder ensure that an air stream passes therethrough, and a suction air stream is established by the fan in the zone where the cropped material is thrown onto the cylinder, whereas on the opposite side of the cylinder the fan expels air through the perforations, the latter being small enough to pass air and dust particles alone. The air stream holds the straw particles on the cylinder surface.

Rotation of the perforated cylinder makes it possible to continuously dispose fo the straw particles held on the cylinder surface by the air stream. As a result, the straw particles offer no resistance to the movement of grain upon its having rebounced out of the surface of the rotary cylinder, whereby the loss of grain in the applied device can be minimized at a rather intense rate of feed of the cropped material.

The chamber receiving the straw particles is hermetically held to the surface of the rotary cylinder, its hermetic tightness being to isolate the chamber from the effect of both the suction and discharge air stream produced by the fan of the device. After having passed under the bottom seal into the zone of the chamber the straw particles are free to separate from the surface of the rotary cylinder largely by virtue of centrifugal forces, and to collect in the chamber.

The chamber accommodates an auger conveyer adapted to continuously bring the straw particles out of it and bring them outside of the harvester separator. Provision of the auger conveyer enables one to dispense with a large-sized chamber inside the separator.

Thus, the precleaner of the present invention features such a construction of its working members and their arrangement inside a harvester-thresher machine that make it possible to obtain high effect of the cropped material separation into its main components, which conduces to a higher throughput capacity of the harvester cleaning unit and makes possible separate collection of the chaff, which is most valuable as fodder.

BRIEF DESCRIPTION OF THE DRAWINGS

For a better understanding of the present invention, appended to the description thereof are the drawings of a specific embodiment of a device for precleaning the cropped material treated by a grain harvester, wherein.

DESCRIPTION OF THE PREFERRED EMBODIMENTS

Figure 1:
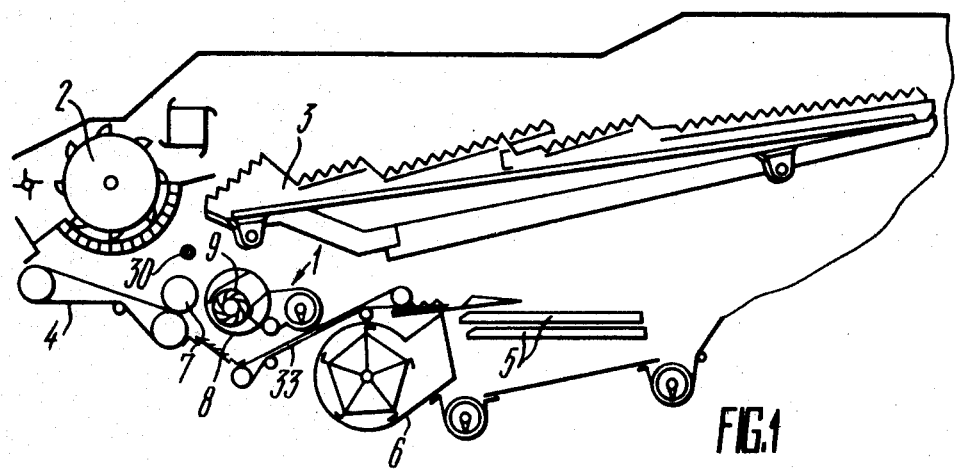
FIG. 1 is a schematic longitudinal-section view of a grain harvester incorporating the precleaner device, according to the present invention.

Now referring to the accompanying drawings FIG. 1 represents a cropped material precleaner device 1 accommodated in the separator of a grain harvesting machine and incorporating a threshing-and-separating unit 2, a straw walkers rack 3, a conveying element 4, sieves 5, cleaning fan 6, as well as elements to convey the grain mass to the separator, the separated grain to the tank, and the tailings to the rethreshing device, all these being not shown in the drawing. The precleaner device 1 incorporates a cropped material thrower 7, and a perforated cylinder 8, which accommodates a fan 9.

Figure 2:
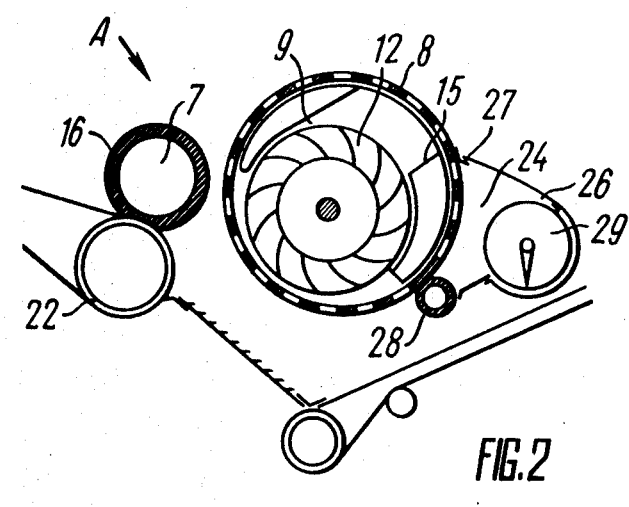
FIG. 2 is a longitudinal-section view of the precleaner device, according to the present invention.
Figure 3:
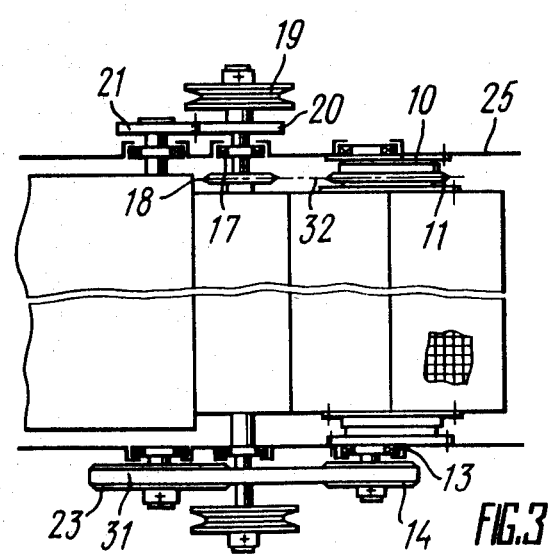
FIG. 3 is a plan view of the precleaner device taken along the arrow A in FIG. 2, according to the present invention.

The precleaner device (FIGS. 2, 3) comprises the cylinder 8 resting upon two rotary supports 10, a driving sprocket 11 being held to the cylinder 8. The fan consists of a rotor 12 having two rotary supports 13 and a drive pulley, as well as a casing 15 locked-in with the housings of the supports 13 of the rotor 12. The thrower 7 is in fact a roll with an elastic surface 16 contacting the surface of the belt of the conveying element 4. The roll rests upon two rotary supports 17 and is provided with a sprocket 18, an input pulley 19 and a gear 20 meshing a gear 21 of the drive shaft of a conveyor 22, one of the shaft extension carrying a pulley 23.

Hermetically held to the surface of rotation of the cylinder 8 is a chamber 24 for the light admixtures of the cropped material to collect and bring outside of the grain harvesting machine. The chamber is defined by two side panels 25 making part of the separator of the grain harvesting machine, and a casing 26 having seals 27, 28. The bottom seal 28 is preferable to be made as a roll with an elastic surface. The chamber 24 accommodates an auger conveyer 29.

The cropped material precleaner device of the present invention operates as follows.

The input pulley 19 of the thrower 7 shaft is set in rotation form one of the separator shafts, e.g., from the shaft of the grain harvester front countershaft 30. Then rotation is transmitted from the thrower 7 roll through the gears 20, 21 to the driving shaft of the conveyer 22, wherefrom rotation is imparted through the pulleys 23, 14 and a V-belt 31 to the rotor 12 of the fan 9. Then rotation is translated through the sprockets 11, 18 and a chain 32 to the perforated cylinder 8 from which the roll of the seal 28 is rotated. The auger conveyer 29 receives motion from the thrower 7 roll through a V-belt drive.

While harvesting the cropped material is fed to the conveying element 4 to get under the roll of the thrower 7 and is then thrown onto that portion of the surface of the perforated cylinder 8 where the air stream is sucked by the fan 9. Having impinged upon the surface of the cylinder the grain bounces out of that surface due to its being a more elastic body than the straw particles (chaff, part of cavings) and featuring much less sailing properties than these particles, to get onto the precleaned material conveyer 33, which transfers that material to the sieves. On the other hand, the straw particles are practically devoid of elasticity but possess high sailing properties, whereby these particles are entrained by the air stream and held by it to the surface of the cylinder 8.

Rotation of the cylinder enables the straw admixtures to be continuously brought beyond the suction zone and thrown down into the chamber 24 past the roll of the seal 28, wherefrom the light straw particles are carried by the auger conveyer 29 away from the separator of the grain harvesting machine.

Such a constructional arrangement of the precleaner device makes it possible to reduce loss of grain from two to four times, to considerably increase the throughput of the grain harvesting machine with the established grain cleanness standards remaining unaffected. In addition, the precleaner device, apart from performing its cardinal function i.e., increasing the throughput capacity of a harvester, makes it possible to separate from the cropped material grainless part of the crop harvested, that is, the chaff, which is most valuable as fodder.

What is claimed is:

1. A precleaner apparatus for use in a grain harvesting machine for precleaning grain material, said precleaner apparatus comprising, a rotary driven perforated cylinder for receiving thereagainst cropped grain material thrown against it, for transporting light admixtures of chaff and straw particles downstream of the perforated cylinder and to allow the grain to drop below the perforated cylinder, a rotary driven precleaning fan internally of the perforated cylinder for developing a suction to attract and maintain said light admixtures of chaff and straw particles for delivery by the perforated cylinder downstream thereof and to allow the grain to bounce off the perforated cylinder, and a thrower device upstream of the perforated cylinder to throw the cropped grain material against the perforated cylinder.

2. A precleaner apparatus for use in a grain harvesting machine according to claim 1, including means defining a chamber downstream of the rotary driven perforated cylinder for receiving the light admixtures from the cylinder and for maintaining the light admixtures completely separate from said grain.

3. A precleaner apparatus for use in a grain harvesting machine according to claim 2, including seals maintaining a seal between the periphery of the perforated cylinder and said chamber to preclude the light admixtures from being delivered back from said chamber against the perforated cylinder.

4. A precleaner apparatus for use in a grain harvesting machine according to claim 2, including means cooperative with said fan for effectively developing a suction zone for maintaining the light admixtures on the perforated cylinder and allowing the grain to drop free of the periphery of the perforated cylinder and to render ineffective the suction of the precleaning fan in a zone for delivery of the light admixtures transported by the perforated cylinder into said chamber.

5. A precleaner apparatus for use in a grain harvesting machine according to claim 1, in which said perforated cylinder has a resilient periphery for allowing grain to bounce off the periphery and said light admixtures to be retained against the periphery of the perforated cylinder and be transported thereon.

6. A precleaner apparatus for use in a grain harvesting machine according to claim 1, in which said thrower device is disposed spaced from the perforated cylinder and comprises a roll with an elastic peripheral surface circumferentially thereof.

7. A precleaner apparatus for use in a grain harvesting machine according to claim 4, including means downstream of the perforated cylinder defining a chamber for receiving said light admixtures of chaff and straw particles from the perforated cylinder and including transport means for transporting said light mixtures, out of said chamber.

8. A precleaner apparatus for use in a grain harvesting machine according to claim 7 in which said transport means comprises an auger conveyor.

9. In a grain harvesting machine having a conveyor for conveying threshed grain marerial, straw walkers to remove straw from the threshed grain material, and sieves, a precleaner for receiving the threshed grain material from said conveyor for precleaning it comprising a rotary driven perforated cylinder for receiving threshed grain material thrown against it for transporting light admixtures of chaff and straw particles thrown against it, a thrower device upstream of the perforated cylinder for throwing threshed grain material being on said conveyor against the perforated cylinder to cause grain to impinge thereon, bounce and fall clear of the perforated cylinder, means including a rotary driven precleaning fan internally of the perforated cylinder for developing a suction zone peripherally of the cylinder effective to allow the grain to fall freely and to suck said light admixtures against the perforated cylinder and hold them thereon for transport to a downstream zone immediately downstream of the perforated cylinder into which said light admixtures are delivered by the perforated cylinder and then released from the perforated cylinder, means in said downstream zone defining a chamber for maintaining the light admixtures completely separated from said grain, and a conveyor for receiving the falling grain after impingement on the perforated cylinder and transporting the grain to said sieves.

10. In a grain harvesting machine according to claim 9 including a conveyor internally of said chamber for transporting said light admixtures received in said chamber and transporting them separately from the grain.

* * * * *